Feb. 12, 1952     F. S. GUSSICK     2,585,383
REGULATING VALVE
Filed Feb. 5, 1949
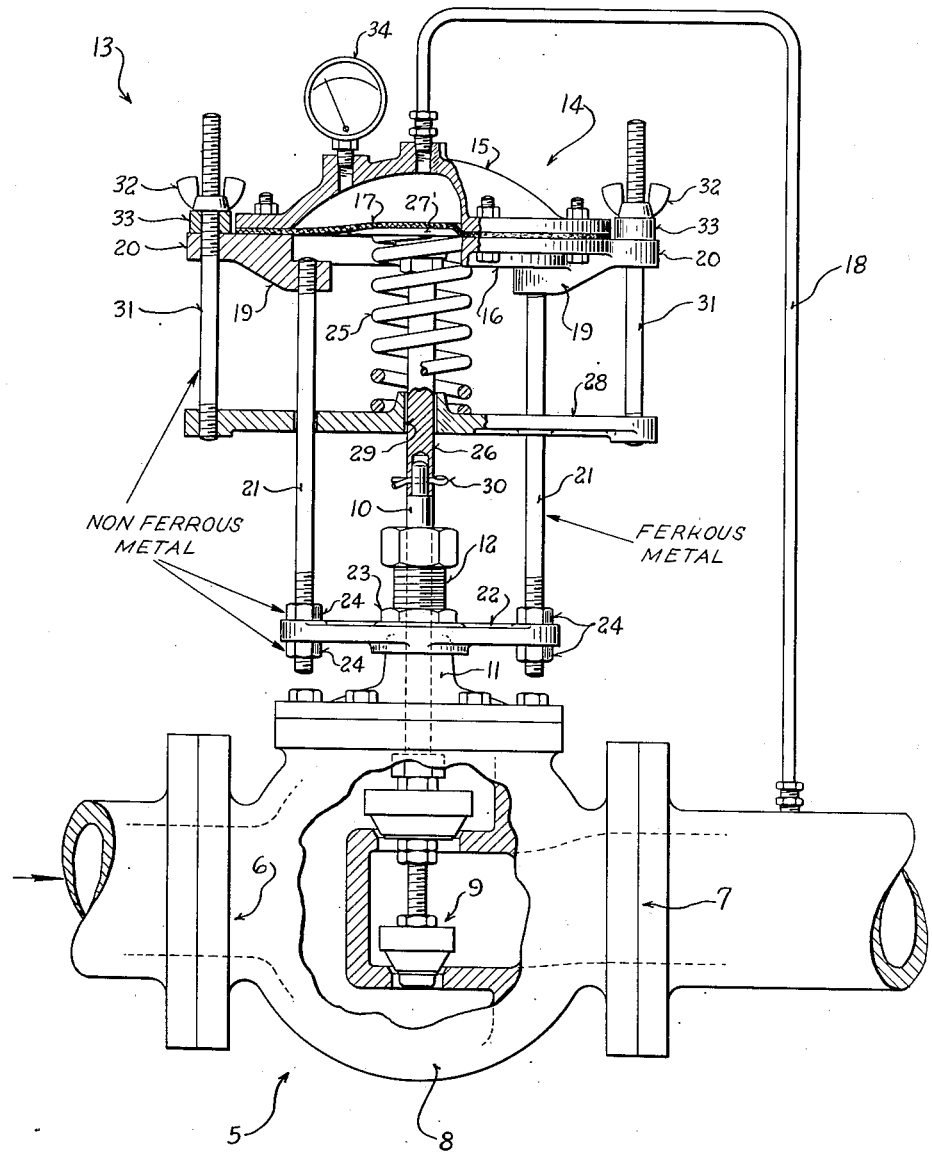
Inventor
Frank S. Gussick Patented Feb. 12, 1952

2,585,383

UNITED STATES PATENT OFFICE 2,585,383

REGULATING VALVE

Frank S. Gussick, Milwaukee, Wis.

Application February 5, 1949, Serial No. 74,765

3 Claims. (Cl. 50—23)

This invention relates to constant pressure valves of the type particularly adapted for use on high pressure steam lines. These valves, often termed reducing valves, generally comprise a pressure responsive valve actuator having a spring loaded diaphragm with the diaphragm chamber connected with that part of the line in which a predetermined pressure is to be maintained, so that the pressure to be maintained reacts against the spring, the tension of which is adjustable to enable the maintenance of different pressures.

In the past these valve actuators or regulators commonly have been mounted on the valves they controlled by means of long parallel supporting rods having threads extending the full length thereof. The lower ends of the rods were anchored in a part rigid with the valve bonnet and the valve stem bore directly against the underside of the diaphragm. The regulator spring encircled the valve stem and was confined between a crossbar adjustably mounted on the threaded supporting rods by nuts threaded thereon above and below the crossbar. The tension of the spring was adjusted by moving these nuts between which the crossbar was clamped up and down on the threaded rods.

While this arrangement was theoretically capable of satisfactorily performing the functions of a constant pressure outlet or reducing valve it was unsatisfactory in service. Because of the way in which the regulator was constructed and mounted on the valve, replacement of the diaphragm, which is necessary about every six months, was one of the worst jobs in the boiler room. Obviously to replace the diaphragm it was necessary to remove all the bolts which clamp the diaphragm between the flanges of the complementary frame members of the regulator, but since it was almost impossible to remove the entire regulator after it had been in service a short while, the removal of the flange bolts had to be done "on location." Even this might not be too serious if the valves were conveniently situated; but ordinarily they are located in the most inconvenient positions directly under the ceiling where the temperature in a boiler room often exceeds 200° F. The replacement of the diaphragm, therefore, generally was an exceptionally arduous task.

It is, therefore, an object of this invention to so mount the pressure responsive regulator upon the valve that regardless of how long the unit may be in service the regulator is always readily removable from the valve. As a result of such detachability of the regulator, the inconvenience experienced heretofore in the replacement of the diaphragm is overcome, since upon being detached, the regulator may be brought to any convenient location for servicing.

Another object of this invention is to improve the manner in which the tension of the diaphragm spring is adjusted.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

The single figure is a side view of a regulating valve embodying this invention, parts thereof being broken away and in section.

Referring more particularly to the accompanying drawing, the numeral 5 designates a valve unit having an inlet 6 adapted to be connected with a source of fluid under pressure, and an outlet 7 connectable with a line in which the pressure is to be maintained at a predetermined constant value. The valve unit comprises a body 8 and a valve plug assembly 9 from which a reciprocable valve stem 10 extends. The valve plug assembly cooperates with valve seats formed within the valve body, and the valve stem projects upwardly through a bonnet 11 and a packing gland 12 to have its upper extremity exposed for connection with a pressure regulating unit designated generally by the numeral 13.

Though the valve unit may be of any suitable design, the unit here illustrated is like that of Patent No. 2,069,364 issued to Frank S. Gussick. The advantage of this type of valve resides in the fact that it seats under pressure upon release of its valve stem. This advantage will be more fully appreciated as the description proceeds.

The regulating unit 13 is pressure responsive and comprises a pressure head 14 consisting of complementary upper and lower frame members 15 and 16, respectively, having mating flanges bolted together with a diaphragm 17 clamped therebetween. The diaphragm coacts with the upper frame member 15 to form an expansible pressure chamber which is connected through a bleed line 18 with the outlet side of the valve. Hence the pressure at the outlet side of the valve is manifested in the diaphragm chamber to provide one of the two forces necessary for effecting adjustment of the position of the valve plug assembly 9.

The lower frame member 16 is substantially a flat ring having diametrically opposite inwardly and outwardly projecting lugs 19 and 20, respectively. The inner lugs 19 have supporting rods 21 anchored thereto and extending downwardly from the pressure head in spaced parallel relationship to one another. The lower ends of the rods 21 are detachably secured to the outer ends of a yoke 22 which is securely anchored to the bonnet 11 by a nut 23 threaded over the exterior of the packing gland 12, so that the yoke may be considered to be fixed with respect to the valve body. The lower extremities of the supporting rods 21 are threaded and pass loosely through apertures in the ends of the yoke, and nuts 24 on the supporting rods may be drawn up against opposite sides of the yoke to securely detachably mount the regulating unit in place on the valve unit with the diaphragm chamber centered substantially directly over the axis of the valve stem.

As will be readily apparent, removal of the bottom nuts 24 enables the supporting rods 21 to be lifted off the yoke 22 when it is desired to disconnect the regulating unit from the valve unit. To assure that the nuts 24 will always be easily removable they are preferably formed of non-ferrous metal if the supporting rods 21 are of ferrous metal. Obviously, of course, any other suitable non-corrosive materials may be used for the rods and nuts.

Movement of the diaphragm 17, in response to the counteracting forces of the pressure within the diaphragm chamber and a diaphragm spring 25, is imparted to the valve stem 10 through a rod-like valve actuating element 26. This element has an enlarged flat head 27 bearing against the underside of the diaphragm and against which the upper end of the diaphragm spring 25 abuts, the spring being confined between the head 27 and a crossbar 28 slidably mounted on the supporting rods 21 for up and down motion.

The valve actuating element 26 projects loosely through a hole 29 in the center of the crossbar 28 and is readily detachably connected to the valve stem 10 by a cotter pin 30 or the like. However, to hold the valve stem 10 and its actuating element in alignment the connected ends of these members telescope one within the other.

The crossbar 28 is supported from the lower frame member by tension screws 31 anchored in the ends of the crossbar and projecting upwardly through holes in the lugs 20 to have wing nuts 32 threaded on their upper ends. These nuts bear down onto the lugs 20, preferably through spacing washers 33 which bring the adjusting nuts above the flange on the upper frame member 15 to facilitate their adjustment.

Turning the nuts 32 onto the tension screws 31 draws the crossbar 28 upwardly to increase the tension on the spring 25, and such increased tension of the spring increases the pressure maintained at the outlet side of the valve. To facilitate the setting of the pressure thus to be maintained, a pressure gauge 34 is mounted on the upper frame member 15 in communication with the diaphragm chamber.

Since valves of this nature are inevitably subjected to severe corrosive effects, the tension screws and the spacing washers 33 are preferably formed of non-ferrous metal where the adjusting screws 32 are of ferrous metal.

As will be readily apparent to those skilled in the art, the way in which the regulating unit is mounted on the valve which it controls permits easy and quick detachment of the entire regulating unit to enable the same to be brought down to a convenient location whenever replacement of the diaphragm or any other servicing of the regulating unit is necessary. Such detachment of the regulating unit merely involves disconnection of the bleed line 18 from the upper frame element 15, withdrawal of the pin 30 to disconnect the valve stem from its actuating element, and removal of the bottom nuts 24 from the supporting rods 21. Thereupon the entire regulating unit is free to be lifted off the valve unit and brought down to a place of convenient manipulation.

Upon disconnection of the valve stem from its actuating element the valve automatically closes if it is of that type covered by the aforesaid Patent No. 2,069,364 or others which operate in a similar manner. This has the advantage of obviating the need for disconnecting the steam line whenever servicing of the regulator unit is necessary.

From the foregoing description taken in connection with the accompanying drawing, it will be readily apparent that this invention provides a manner of mounting the regulating unit of a pressure regulating valve upon the body of the valve unit which assures that the regulating unit always will be easily and quickly detachable from the valve unit, and that the manner of adjusting the tension of the diaphragm spring constitutes a substantial improvement over past ways of effecting this adjustment.

What I claim as my invention is:

1. In a pressure regulating valve, the combination of: a valve unit having a body provided with a bonnet and a valve stem projecting through the bonnet; a fluid pressure responsive regulating unit having a frame formed of complementary top and bottom members, a diaphragm clamped between said members and coacting with the top member to provide an expansible pressure chamber adapted to be connected with a fluid pressure source, and a valve actuating element bearing against the diaphragm for transmitting motion thereof to the valve stem; substantially parallel supporting rods fixed to the bottom complementary frame member of the regulating unit at one end and adapted to be removably connected to a rigid part on the valve bonnet at the other end; a crossbar slidable on the supporting rods and having the valve actuating element projecting loosely therethrough; a spring confined between the crossbar and the diaphragm; adjustable tension screws connecting the crossbar with the bottom complementary frame member of the regulating unit and holding the crossbar in a position maintaining the spring under adjustable tension; means rigidly but readily removably securing said supporting rods to a rigid part on the bonnet of the valve unit with the valve actuating element substantially in line with the valve stem; and a readily separable connection between said valve actuating element and the valve stem, whereby the entire regulating unit may be removed from the valve unit upon disconnection of the valve stem from the valve actuating element and detachment of the supporting rods from the part rigid on the valve bonnet.

2. In a pressure regulating valve, a valve unit having a valve body, a valve bonnet secured to the valve body and a valve stem projecting therethrough; a fluid pressure responsive regulating unit for the valve, said unit comprising: a yoke member secured to the valve bonnet in a manner allowing rotary adjustment thereof about the axis of the valve bonnet; a pressure responsive head including complementary top and bottom members and a diaphragm clamped between said members to form a pressure chamber; supporting rods rigidly attached to the bottom member of said pressure head and extending downwardly therefrom in spaced parallel relationship; a motion transmitting element having one end thereof bearing against the underside of the diaphragm to be movable therewith; a crossbar slidably mounted on said supporting rods and having said motion transmitting element projecting loosely therethrough; a spring confined between the underside of the diaphragm and said crossbar; adjustable tension screws connecting the crossbar with the bottom member of said pressure head and by which the tension of said spring is readily adjustable; means rigidly but readily removably securing said supporting rods to the yoke member on the bonnet with the valve actuating element substantially in line with the valve stem so that the entire pressure head is adjustable with the yoke member about the axis of the bonnet and the valve stem; and a readily separable connection between said valve actuating element and the valve stem, whereby the entire regulating unit may be removed from the valve unit upon disconnection of the valve stem from the valve actuating element and detachment of the supporting rods from the yoke member.

3. In a pressure regulating valve; a valve unit comprising a hollow body having an inlet and an outlet communicated with one another and a valve seat between the inlet and outlet, and a valve in said body movable into and out of engagement with said valve seat and having a stem extending through a wall of said body to the exterior thereof; a fluid pressure responsive regulating unit comprising a flexible diaphragm and rigid wall means cooperating with said diaphragm to define a pressure chamber; a valve actuating element in engagement with the diaphragm for transmitting motion of the diaphragm to the valve stem; a crossbar having a hole therein through which said valve actuating element projects; a compression spring confined between the crossbar and the diaphragm and surrounding the valve actuating element; adjustable tension screws connecting the crossbar with said rigid wall means of the pressure chamber and holding the crossbar in a position spaced from and facing the diaphragm to hold the spring under adjustable tension; rigid support means secured to said rigid wall means of the pressure chamber and extending to one side of the pressure chamber; means rigidly but readily detachably securing said rigid support means to the body of the valve unit; and means readily detachably connecting said valve actuating element with said valve stem.

FRANK S. GUSSICK.

REFERENCES CITED

The following references are of record in the file of this patent:

UNITED STATES PATENTS

| Number | Name | Date |
|---|---|---|
| 646,428 | Hardie | Apr. 3, 1900 |
| 1,237,922 | Lucas | Aug. 21, 1917 |
| 2,008,125 | Bailey | July 16, 1935 |
| 2,241,324 | Shelby | May 6, 1941 |
| 2,444,563 | Gebauer | July 6, 1948 |
| 2,483,426 | Moore | Oct. 4, 1949 |